(12) United States Patent
Li et al.

(10) Patent No.: US 10,620,496 B2
(45) Date of Patent: Apr. 14, 2020

(54) ARRAY SUBSTRATE, MANUFACTURING METHOD OF ARRAY SUBSTRATE AND LIQUID CRYSTAL DISPLAY PANEL

(71) Applicant: Wuhan China Star Optoelectronics Technology Co., Ltd., Wuhan, Hubei (CN)

(72) Inventors: Renpeng Li, Guangdong (CN); Yoneda Kotaro, Guangdong (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 152 days.

(21) Appl. No.: 15/916,380

(22) Filed: Mar. 9, 2018

(65) Prior Publication Data

US 2019/0094638 A1  Mar. 28, 2019

Related U.S. Application Data

(63) Continuation of application No. PCT/CN2018/071559, filed on Jan. 5, 2018.

(30) Foreign Application Priority Data

Sep. 28, 2017 (CN) .......................... 2017 1 0934432

(51) Int. Cl.
*G02F 1/1362* (2006.01)
*G02F 1/1337* (2006.01)
(Continued)

(52) U.S. Cl.
CPC ...... *G02F 1/136227* (2013.01); *G02F 1/1337* (2013.01); *G02F 1/134309* (2013.01); *G02F 1/133345* (2013.01)

(58) Field of Classification Search
CPC ............. G02F 1/136227; G02F 1/1337; G02F 1/134309

See application file for complete search history.

(56) References Cited

U.S. PATENT DOCUMENTS 9,664,960 B2  5/2017  Choi et al.
2016/0048045 A1*  2/2016  Imai ...................... G02F 1/1337
349/123

FOREIGN PATENT DOCUMENTS

CN  203630483 U  6/2014
CN  204331229 U  5/2015
(Continued)

*Primary Examiner* — Lucy P Chien
(74) *Attorney, Agent, or Firm* — Hemisphere Law, PLLC; Zhigang Ma

(57) ABSTRACT

An array substrate, a manufacturing method thereof and a liquid crystal display panel are provided. The array substrate comprises a source-drain layer stacked, a pixel electrode layer and an interval layer, comprising a via hole structure. The pixel electrode layer is electrically connected to the source-drain layer through the via hole structure, comprising a via hole and a plurality of drainage grooves provided at intervals on an edge of the via hole. The pixel electrode layer forms a groove corresponding to the via hole, and the pixel electrode layer forms a sub-drainage groove corresponding to each drainage groove. When the alignment layer is disposed on the pixel electrode, an alignment liquid for forming an alignment layer flow into the groove through a sub-drainage groove, so that the groove can also cover an alignment film and ensure a normal display of the liquid crystal display panel formed by the array substrate.

3 Claims, 6 Drawing Sheets

(51) Int. Cl.
    *G02F 1/1343*     (2006.01)
    *G02F 1/1333*     (2006.01)

(56) References Cited

FOREIGN PATENT DOCUMENTS

| CN | 105321955 A | 2/2016 |
|----|-------------|--------|
| CN | 105355630 A | 2/2016 |
| CN | 107479292 A | 12/2017 |

\* cited by examiner

ARRAY SUBSTRATE, MANUFACTURING METHOD OF ARRAY SUBSTRATE AND LIQUID CRYSTAL DISPLAY PANEL

RELATED APPLICATIONS

This application is a continuation application of PCT Patent Application No. PCT/CN2018/071559, filed Jan. 5, 2018, which claims the priority benefit of Chinese Patent Application No. 201710934432.3, filed Sep. 28, 2017, which is herein incorporated by reference in its entirety.

FIELD OF THE DISCLOSURE

The disclosure relates to a display panel manufacturing technical field, and more particularly to an array substrate, a manufacturing method of an array substrate, and a liquid crystal display panel.

BACKGROUND

Due to its small size, low power consumption and no radiation, a liquid crystal display panel (LCD) has drawn great attention in a field of a flat panel display and has been widely applied to all walks of life. The liquid crystal display panel is usually made of a color film substrate and an array substrate. Wherein the array substrate generally comprises a source-drain layer, an interval layer disposed on the source-drain layer, and a pixel electrode layer disposed on the interval layer. Wherein a via hole needs to be disposed on the interval layer so that the pixel electrode layer is electrically connected to the source-drain layer through the via hole so as to drive and display the liquid crystal display panel. When the pixel electrode is electrically connected to the source-drain through the via hole, a groove is formed on the pixel electrode layer corresponding to a position of the via hole. Wherein since an area of the via hole is smaller so that an alignment film is subsequently disposed on the pixel electrode layer, bubbles are likely to be generated in a groove, so that an alignment liquid for forming the alignment film does not easily enter the groove of the pixel electrode layer and is evenly dispersed in the groove; therefore, an alignment film is lacking in the area, so that a display abnormality occurs in the liquid crystal display panel.

SUMMARY

The present disclosure provides an array substrate, a manufacturing method of an array substrate, and a liquid crystal display panel, so that each position of a pixel electrode layer of the array substrate can be covered with an alignment film to ensure normal display of the liquid crystal display panel formed by the array substrate.

The array substrate comprises a substrate, a source-drain layer stacked on the substrate, the pixel electrode layer disposed on the source-drain layer, and an interval layer stacked between the source-drain layer and the pixel electrode layer; wherein the interval layer comprises a via hole structure, the via hole structure comprises a via hole and a plurality of drainage grooves provided at intervals on an edge of the via hole, the drainage groove is recessed in a direction from an inner wall of the via hole away from the inner portion of the via hole, the via hole has a first hole and a second hole opposite to the first hole, and the drainage groove extends from the first hole to the second hole; the pixel electrode layer is electrically connected to the source-drain layer through the via hole structure.

Wherein an angle between an extending direction of the drainage groove and an axial direction of the via hole is the same as the angle between the inner wall of the via hole and the axial direction.

Wherein the pixel electrode layer forms a groove corresponding to a position of the via hole, and the pixel electrode layer forms a sub-drainage groove corresponding to the position of each drainage groove.

Wherein the array substrate further comprises an alignment layer, and the alignment layer covers the pixel electrode layer.

The manufacturing method of the array substrate comprises steps of:

Forming the source-drain layer on the substrate by a patterning process;

Forming the interval layer on the source-drain layer and forming the via hole structure on the interval layer by the patterning process, wherein the via hole structure comprises the via hole and the plurality of drainage grooves provided at intervals on the edge of the via hole, the drainage groove is recessed in a direction from the inner wall of the via hole away from the inner portion of the via hole, the via hole has the first hole and the second hole opposite to the first hole, and the drainage groove extends from the first hole to the second hole; the angle between the extending direction of the drainage groove and the axial direction of the via hole is the same as or different from the angle between the inner wall of the via hole and the axial direction;

Forming the pixel electrode layer on the interval layer, and electrically connecting the pixel electrode layer to the source-drain layer through the via hole structure, wherein the pixel electrode layer forms the groove of same size of the via hole corresponding to the position of the via hole, and forms a sub-drainage groove of same size of the drainage groove corresponding to the position of each drainage groove; and Covering the alignment layer on the pixel electrode layer, covering the pixel electrode layer, the inner wall of the groove and the inner wall of the sub-drainage groove of the pixel electrode layer.

Wherein "forming the via hole structure on the interval layer by the patterning process" comprises the steps of:

Sequentially forming an interval material layer and a photoresist material layer on the source-drain layer;

Transferring a via pattern on a photomask to the photoresist material layer by exposing and developing the photoresist material layer through the photomask, wherein the via hole pattern on the photomask is the same size as the via hole structure;

Etching the interval material layer, and transferring the via hole pattern formed on the photoresist material layer to the interval material layer to acquire the interval layer having the via hole structure; and Peeling off the photoresist layer.

Wherein the angle between the extending direction of the drainage groove and the axial direction of the via hole is the same as the angle between the inner wall of the via hole and the axial direction, the photomask comprises a light-shielding area, a light-transmitting area and a plurality of semi-light-transmitting areas, the plurality of semi-light-transmitting areas surround the light-transmitting area and are arranged at intervals, the semi-transmitting areas are connected to the light-transmitting area, and a light transmittance of the semi-light-transmitting area gradually increases from a direction away from the light-transmitting area towards the direction of the light-transmitting area; the via hole is formed corresponding to the position of the light-transmitting area on the interval layer, and the drainage groove is formed corresponding to the position of the semi-light-transmitting area.

Wherein when the angle between the extending direction of the drainage groove and the axial direction of the via hole is different from the angle between the inner wall of the via hole and the axial direction, the photomask comprises the light-shielding area, a first light-transmitting area and a plurality of second light-transmitting areas, the plurality of second light-transmitting areas surround the first light-transmitting area and are arranged at intervals, and the second light-transmitting areas are connected to the first light-transmitting area; the via hole is formed corresponding to the position of the first light-transmitting area on the interval layer, and the drainage groove is formed corresponding to the position of the second light-transmitting area.

Wherein the step of "forming the alignment layer covering the pixel electrode layer on the pixel electrode layer, covering the pixel electrode layer, the inner wall of the groove and the inner wall of the sub-drainage groove of the pixel electrode layer" comprises the steps:

Printing an alignment liquid on the pixel electrode layer and covering the pixel electrode layer, and flowing the alignment liquid into the groove along the sub-drainage groove and attaching to the inner wall of the groove and the sub-drainage groove;

Pre-baking the alignment liquid of the inner wall on the pixel electrode layer, the groove and the sub-drainage groove to acquire the alignment layer covering the pixel electrode layer, the inner wall of the groove and the sub-drainage groove.

The liquid crystal display panel includes the array substrate, a color film substrate facing the array substrate, and a liquid crystal layer sandwiched between the array substrate and the color film substrate, the pixel electrode layer of the array substrate facing the liquid crystal layer.

The present disclosure provides the array substrate, the manufacturing method of the array substrate and the liquid crystal display panel, the plurality of drainage grooves provided at intervals on the edge of the via hole, when the pixel electrode layer stacked on the interval layer, forming the groove of same size of the via hole corresponding to the position of the via hole by the pixel electrode layers, and forming the sub-drainage groove of same size of the drainage groove corresponding to the position of each drainage groove.

Furthermore, when the alignment layer is disposed on the pixel electrode, the alignment liquid for forming the alignment layer can flow into the groove on the pixel electrode through the sub-drainage groove, so that the position of the groove on the pixel electrode layer can also cover the alignment film, so as to ensure the normal display of the liquid crystal display panel formed by the array substrate.

BRIEF DESCRIPTION OF THE DRAWINGS

To describe the technical solutions in the embodiments of the present disclosure or in the prior art more clearly, the following briefly introduces the accompanying figures required for describing the embodiments or the prior art, apparently, the accompanying figures in the following description show merely some embodiments of the present disclosure, and a person of ordinary skill in the art may still derive other drawings from these accompanying figures without creative efforts.

DETAILED DESCRIPTION OF PREFERRED EMBODIMENTS

The technical solutions in the embodiments of the present disclosure will be described clearly and completely hereinafter with reference to the accompanying figures in the embodiments of the present disclosure, apparently, the described embodiments are merely some but not all embodiments of the present disclosure. All other embodiments obtained by a person of ordinary skill in the art based on the embodiments of the present disclosure without creative efforts shall fall within the protection scope of the present disclosure.

Figure 1:
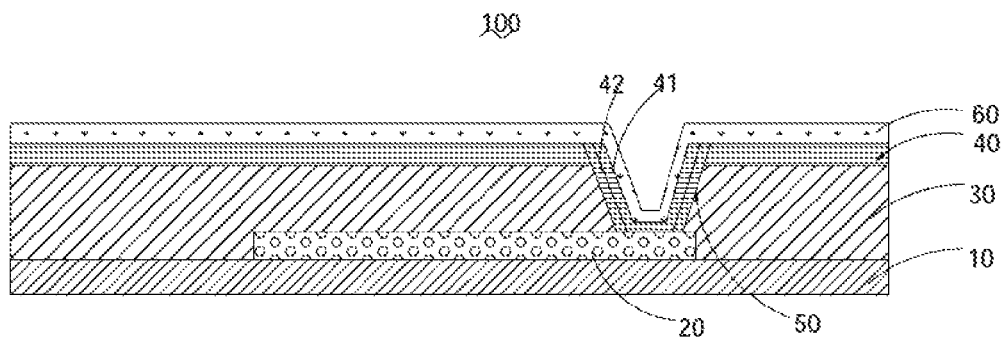
FIG. 1 is a cross-sectional schematic view of an array substrate according to an embodiment of the present disclosure.

See FIG. 1, the present disclosure provides an array substrate 100. The array substrate 100 comprises a substrate 10, a source-drain layer 20 stacked on the substrate 10, a pixel electrode layer 40 disposed on the source-drain layer 20, and an interval layer 30 stacked between the source-drain layer 20 and the pixel electrode layer 40; wherein the interval layer 30 comprises a via hole structure 50, the pixel electrode layer 40 is electrically connected to the source-drain layer 20 through the via hole structure 50. In this embodiment, the interval layer 30 comprises an insulating layer and a planarization layer. It may be understood that the interval layer 30 may further comprise other layer structures according to a design requirement of the array substrate 100.

Figure 2:
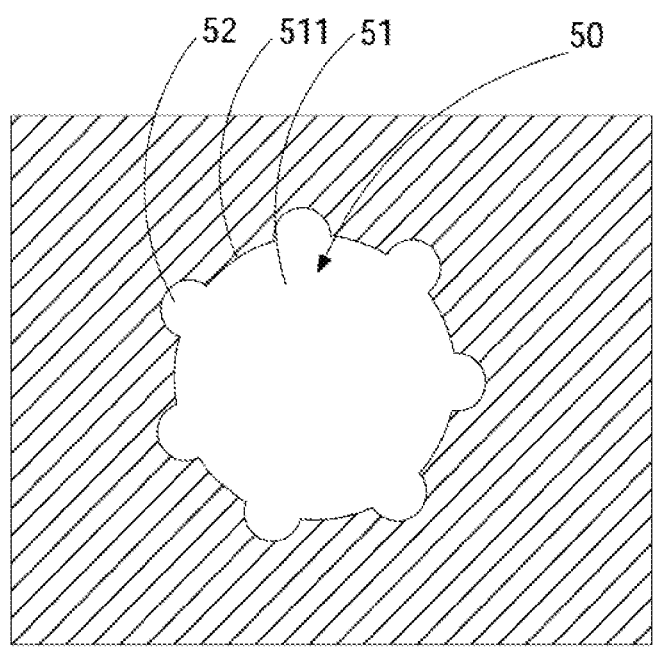
FIG. 2 is a structural schematic view of a via hole of an array substrate of FIG. 1.
Figure 3:
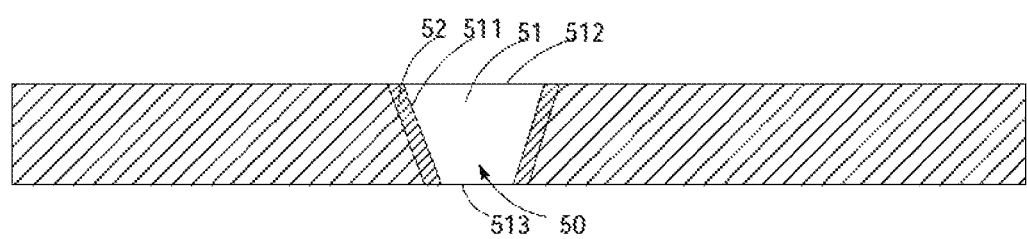
FIG. 3 is a cross-sectional schematic view of a via hole of an array substrate of FIG. 2.

See FIG. 2 and FIG. 3, the via structure 50 comprises the via hole 51 and a plurality of drainage grooves 52 provided at intervals on an edge of the via hole 51, a liquid can flow smoothly into the via hole 51 through the plurality of drainage grooves 52. Wherein a flowing direction of the liquid is an extending direction of the drainage groove 52. The drainage groove 52 is recessed from in a direction an inner wall 511 of the via hole 51 away from the inner portion of the via hole 51. And the via hole 51 has a first hole 512 and a second hole 513 opposite to the first hole 512. The drainage groove 52 extends from the first hole 512 to the second hole 513, that is, the liquid can flow from one end of the first hole 512 to the second hole 513 through the drainage groove 52, so that the liquid can smoothly flow into the hole. In this embodiment, an angle between an extending direction of the drainage groove 52 and an axial direction of the via hole is the same as the angle between the inner wall 511 of the via hole and the axial direction, and the drainage groove 52 extends from an end of the first hole 512 to the end of the second hole 513. See FIG. 4, in the other embodiment of the present disclosure, the angle between the axial direction of the liquid guiding groove 52 and the inner wall 511 of the via hole is different from the angle of the axial direction. In addition, it can be understood that the drainage groove 52 may not extend to one end of the second hole 513, and the drainage groove 52 can still achieve an effect of guiding the liquid into the via hole 51. In addition, the drainage groove 52 may have any shape, for example, the drainage groove 52 may be V-shaped, semicircular, parabolic and so on.

The pixel electrode layer 40 is stacked on the interval layer 30, and the groove 41 is formed at the position corresponding to the via hole 51, the inner wall of the groove 41 has the same size as the inner wall of the via hole 51. The sub-drainage groove 42 is formed at the position corresponding to each drainage grooves 52, and the inner wall of the sub-drainage groove 42 has the same size as the inner wall of the drainage groove 52.

Further, the array substrate 100 comprises an alignment layer 60, and the alignment layer 60 covers the pixel electrode layer 40, that is the alignment layer 60 can cover the inner wall of the groove 41 and the sub-drainage groove 42. Specifically, an alignment liquid for forming the alignment layer 60 can flow into the groove 41 through the sub-drainage groove 42, and bubbles are not easily generated in the groove 41 due to a surface of the alignment liquid, so that the alignment layer 60 can be covered and evenly dispersed in the groove 41 and the alignment layer 60 can cover any position of the pixel electrode layer 40.

Figure 5:
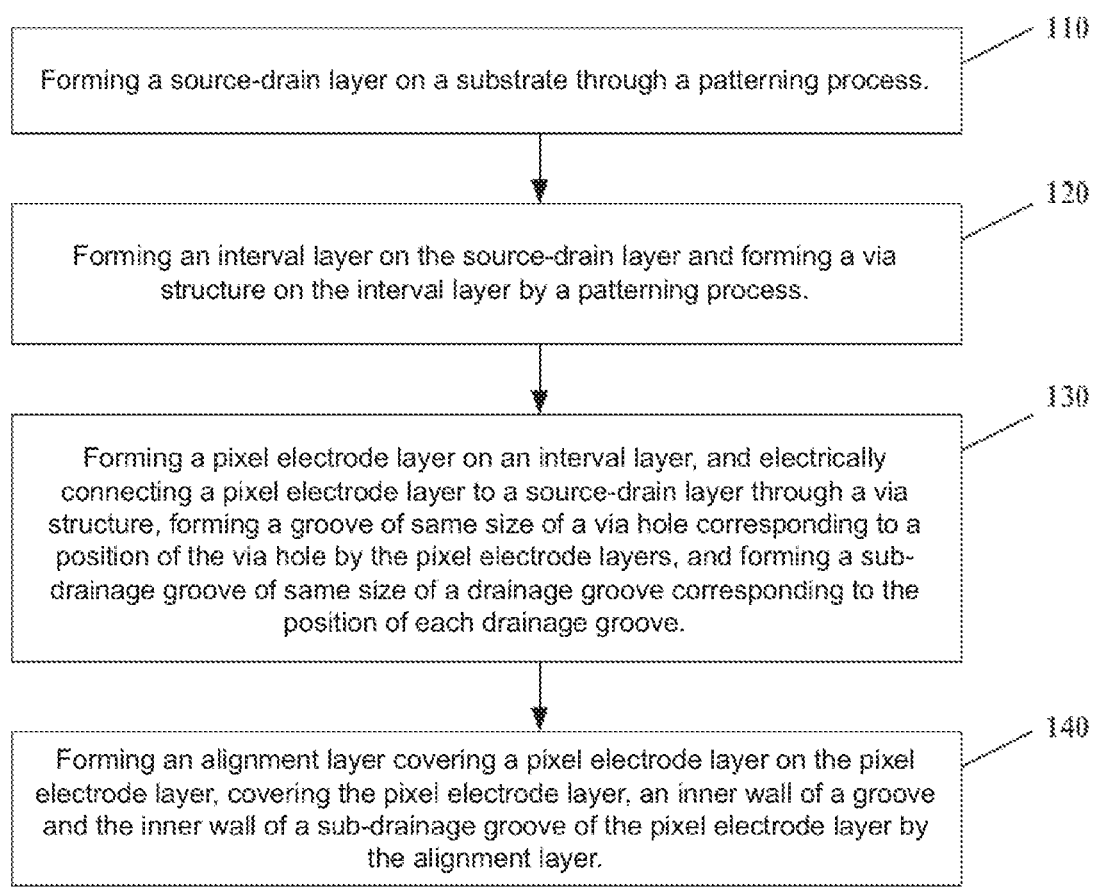
FIG. 5 is a schematic flow chart of manufacturing an array substrate according to an embodiment of the present disclosure.

See FIG. 5, the present disclosure further provides a manufacturing method of array substrate, comprising:

Step 110, forming the source-drain layer 20 on the substrate 10 by a patterning process. Specifically, the patterning process comprises the steps of a photoresist coating, an exposure, a development, an etching and so on, the source-drain layer 20 formed by the patterning process comprises source electrode and drain electrode disposed at intervals.

Step 120, forming the interval layer 30 on the source-drain layer 20 and forming the via hole structure 50 on the interval layer 30 by the patterning process. The structure of the via hole structure 50 has been described, which will not be repeated here.

Figure 6:
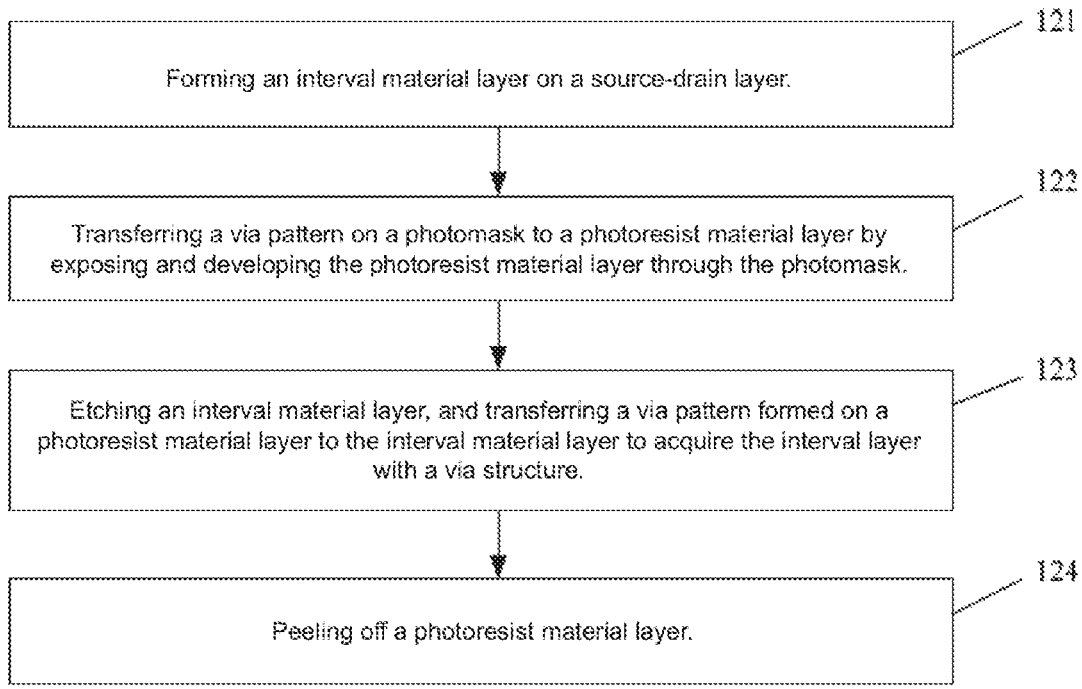
FIG. 6 is a specific flow chart of step 120 in a manufacturing process as shown in FIG. 3.

See FIG. 6, the step 120 further comprises:

An interval material layer is formed on the source-drain layer. The interval material layer is formed on the source-drain layer 20 by a vapor deposition and a coating and so on. In this embodiment, the interval layer 30 comprises an insulating layer and a planarization layer stacked on the insulating layer. The insulating layer is stacked and covered on the source-drain layer 20 by the vapor deposition; and the planarization layer is formed on the insulating layer by coating. Afterwards, a photoresist material layer is formed on the interval material layer by the coating process.

Step 122, the photoresist material layer is exposed and developed through a photomask 70 to transfer the via hole pattern on the photomask 70 on the photoresist material layer. The via hole pattern on the photomask 70 is the same size as the via hole structure. Specifically, a pattern on the photomask is also different according to different via hole structure.

Figure 8:
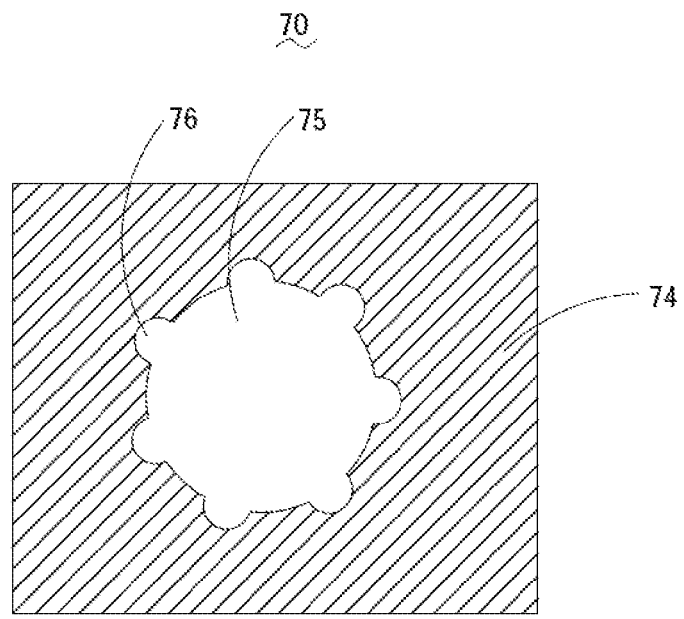
FIG. 8 is a structural schematic view of a light-shielding mask of a via structure on an array substrate as shown in FIG. 3.

See FIG. 3 and FIG. 8, in this embodiment, the drainage groove 52 is parallel to the axial direction of the via hole. The photomask comprises the light-shielding area 74, a first light-transmitting area 76 and a plurality of second light-transmitting areas 75, the plurality of second light-transmitting areas 75 surround the first light-transmitting area 76 and are arranged at intervals, and the second transmitting areas 75 are connected to the first light-transmitting area 76. A portion of the photomask 70 other than the first light-transmitting area 76 and the second light-transmitting area 75 is the light-shielding area 74. Wherein forming the via hole 51 corresponding to the position of the first light-transmitting area 76 on the interval layer 30, and forming the drainage groove 52 corresponding to the position of the second light-transmitting area 75.

Figure 4:
FIG. 4 is a cross-sectional schematic view of a via hole of an array substrate according to another embodiment of the present disclosure.
Figure 9:
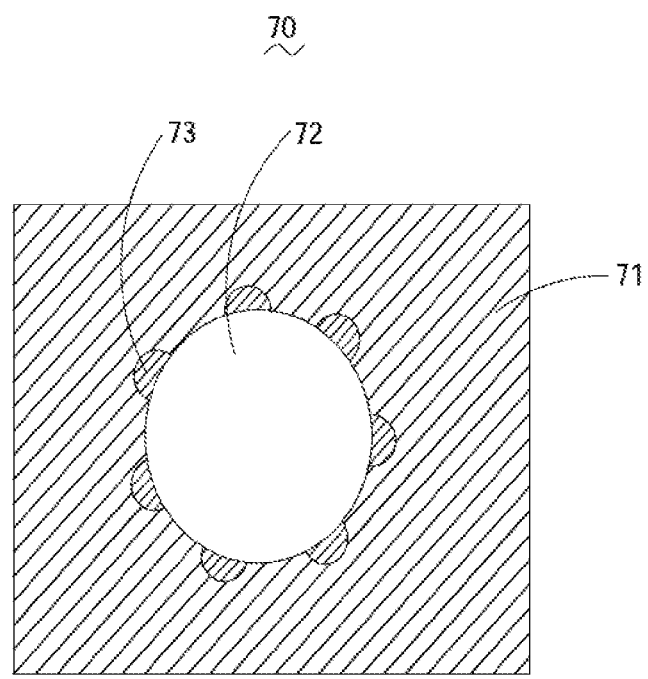
FIG. 9 is a structural schematic view of a light-shielding mask of a via structure on an array substrate as shown in FIG. 4.

Alternatively, see FIG. 4 and FIG. 9, in other embodiments of the present disclosure, when the angle is formed between the drainage groove 52 of the via structure 10 and the inner wall of the via hole 111, the photomask 70 comprises the light-shielding area 71, a light-transmitting area 73 and a plurality of semi-light-transmitting areas 72. The semi-light-transmitting area 72 surround the light-transmitting area 73 and are arranged at intervals, and the semi-transmitting area 72 is connected to the light-transmitting area 73, and a light transmittance of the semi-light-transmitting area 72 gradually increases from a direction away from the light-transmitting area 73 towards the direction of the light-transmitting area 73. The portion of the photomask 70 other than the light-transmitting area 73 and the semi-light-transmitting area 72 is the light-shielding area 71. Wherein the via hole 11 is formed on the interval layer 30 corresponding to the position of the light-transmitting area 73, and the drainage groove 12 is formed corresponding to the position of the light-transmitting area 72. In addition, since the light transmittance of the semi-light-transmitting area 72 gradually increases from the direction away from the light-transmitting area 73 toward the light-transmitting area 73, an etching depth corresponding to the semi-transmitting area 72 is gradually changed, so that the angle is formed between the drainage groove 52 and the inner wall of the via hole 51. Transferring the via patter on the photomask 70 to the photoresist material layer specifically comprises providing the photomask 70 on the photoresist material layer, the photoresist material layer is exposed and developed by the photomask 70 to transfer the via pattern on the photomask 70 to the photoresist material layer.

Step 123, etching the interval material layer, and transferring the via patter formed on the photoresist material layer to the interval material layer to acquire the interval layer 30 with the via structure 50.

Step 124, peeling off the photoresist material layer. After etching the interval material layer is completed and the interval layer 30 with the via hole structure 50 is formed, the photoresist material layer can be peeled off.

Step 130, forming the pixel electrode layer 40 on the interval layer 30, and electrically connecting the pixel electrode layer 40 to the source-drain layer 20 through the via hole structure 50, forming the groove 41 of same size of the via hole corresponding to the position of the via hole 51 by the pixel electrode layers 40, and forming the sub-drainage groove 42 of same size of the drainage groove 52 corresponding to the position of each drainage groove 52. In this embodiment, the pixel electrode layer 40 is formed on the interval layer 30 by the vapor deposition.

Step 140, covering an alignment layer 60 on the pixel electrode layer 40, the alignment layer 60 covering the pixel electrode layer 40, the inner wall of the groove 41 and the inner wall of the sub-drainage groove 42 of the pixel electrode layer 40.

Figure 7:
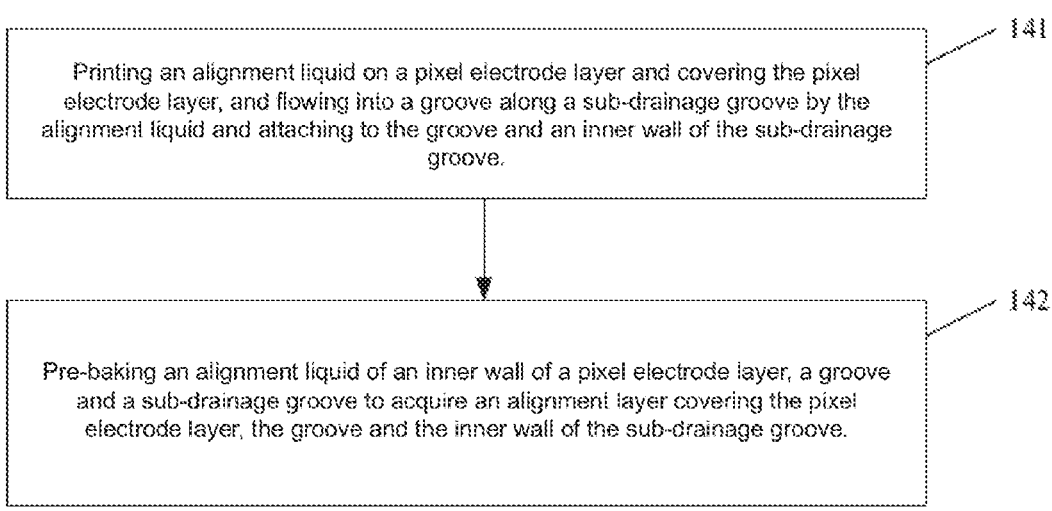
FIG. 7 is a specific flow chart of step 140 in a manufacturing process as shown in FIG. 3.

Specifically, see FIG. 7, step 140 further comprises:

Step 141, printing an alignment liquid on the pixel electrode layer 40 and covering the pixel electrode layer 40, and flowing the alignment liquid into the groove 41 along the sub-drainage groove 42 and attaching to the groove 41 and the inner wall of the sub-drainage groove 42. The alignment liquid is easily to flow into the groove 41 through the sub-drainage groove 42, so as to avoid to generate the bubbles in the groove 41, so that the alignment liquid can enter the grooves 41 of the pixel electrode layer and evenly disperse in the grooves 41, the alignment liquid can be evenly distributed at each position of the pixel electrode layer 40.

Step 142, pre-baking the alignment liquid of the inner wall on the sub-drainage groove 42, the groove 41 of the pixel electrode layer 40 and the pixel electrode layer 40 to acquire the alignment layer 60 covering the pixel electrode layer 42, the inner wall of the groove 41 of the pixel electrode layer 40 and the inner wall of the sub-drainage groove 42.

Figure 10:
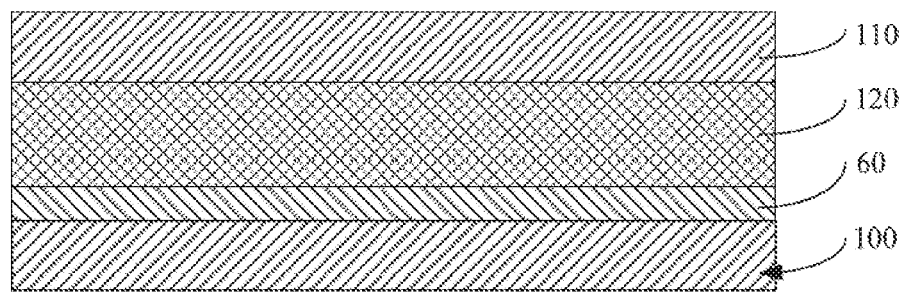
FIG. 10 is a schematic view of a liquid crystal display panel according to an embodiment of the present disclosure.

See FIG. 10, the present disclosure further provides a liquid crystal display panel 200, the liquid crystal display panel 200 comprises the array substrate 100, a color film substrate 110 facing the array substrate 100, and a liquid crystal layer 120 provided between the array substrate 100 and the color film substrate 120. The alignment layer 60 of the array substrate 100 contacts with the liquid crystal layer 120, and liquid crystal molecules in the liquid crystal layer 120 are pre-aligned by the alignment layer 60.

The present disclosure provides the array substrate and the manufacturing method thereof, a plurality of drainage grooves 52 provided at intervals on an edge of the via hole 51 through the interval layer 30, so that when the pixel electrode layer 40 is stacked on the interval layer 30, forming the groove 41 of same size of the via hole 51 corresponding to the position of the via hole 51 by the pixel electrode layers 40, and forming the sub-drainage groove 42 of same size of the drainage groove 52 corresponding to the position of each drainage groove 52. Furthermore, when the alignment layer 60 is disposed on the pixel electrode 40, the alignment liquid for forming the alignment layer 60 can flow into the groove on the pixel electrode 40 through the sub-drainage groove 42, so that the position of the groove 41 on the pixel electrode layer 40 can also cover the alignment film 60, so as to ensure the normal display of the liquid crystal display panel 200 formed by the array substrate 100.

The foregoing disclosure is merely a preferred embodiment of the present disclosure, and certainly can not be used to limit the scope of the present disclosure, persons of ordinary skill in the art may understand that all or part of the procedures for implementing the foregoing embodiments and equivalent changes made according to the claims of the present disclosure still fall within the scope of the present disclosure.

What is claimed is:

1. A manufacturing method of an array substrate, comprising steps of:

forming a source-drain layer on a substrate by a patterning process;

forming an interval layer on the source-drain layer and forming a via hole structure on the interval layer by the patterning process, wherein the via hole structure comprises a via hole and a plurality of drainage grooves provided at intervals on an edge of the via hole, the drainage groove is recessed in a direction from an inner wall of the via hole away from the inner portion of the via hole, the via hole has a first hole and a second hole opposite to the first hole, and the drainage groove extends from the first hole to the second hole; an angle between an extending direction of the drainage groove and an axial direction of the via hole is the same as or different from the angle between the inner wall of the via hole and the axial direction;

forming a pixel electrode layer on the interval layer, and electrically connecting the pixel electrode layer to the source-drain layer through the via hole structure, wherein the pixel electrode layer forms a groove of same size of the via hole corresponding to a position of the via hole, and forms a sub-drainage groove of same size of the drainage groove corresponding to the position of each drainage groove; and covering an alignment layer on the pixel electrode layer, the alignment layer covering the pixel electrode layer, the inner wall of the groove and the inner wall of the sub-drainage groove of the pixel electrode layer;

wherein forming the via hole structure on the interval layer by the patterning process comprises the steps of:

sequentially forming an interval material layer and a photoresist material layer on the source-drain layer;

transferring a via pattern on a photomask to the photoresist material layer by exposing and developing the photoresist material layer through the photomask, wherein a via hole pattern on the photomask is the same size as the via hole structure;

etching the interval material layer, and transferring the via hole pattern formed on the photoresist material layer to the interval material layer to acquire the interval layer having the via hole structure;

peeling off the photoresist material layer; and wherein the angle between the extending direction of the drainage groove and the axial direction of the via hole is the same as the angle between the inner wall of the via hole and the axial direction, the photomask comprises a light-shielding area, a light-transmitting area and a plurality of semi-light-transmitting areas, the plurality of semi-light-transmitting areas surround the light-transmitting area and are arranged at intervals, the semi-transmitting areas are connected to the light-transmitting area, and a light transmittance of the semi-light-transmitting area gradually increases from a direction away from the light-transmitting area towards the direction of the light-transmitting area; the via hole is formed corresponding to the position of the light-transmitting area on the interval layer, and the drainage groove is formed corresponding to the position of the semi-light-transmitting area.

2. The manufacturing method of an array substrate according to claim 1, wherein when the angle between the extending direction of the drainage groove and the axial direction of the via hole is different from the angle between the inner wall of the via hole and the axial direction, the photomask comprises the light-shielding area, a first light-transmitting area and a plurality of second light-transmitting areas, the plurality of second light-transmitting areas surround the first light-transmitting area and are arranged at intervals, and the second light-transmitting areas are connected to the first light-transmitting area; the via hole is formed corresponding to the position of the first light-transmitting area on the interval layer, and the drainage groove is formed corresponding to the position of the second light-transmitting area.

3. The manufacturing method of an array substrate according to claim 1, wherein the step of "forming the alignment layer covering the pixel electrode layer on the pixel electrode layer, covering the pixel electrode layer, the inner wall of the groove and the inner wall of the sub-drainage groove of the pixel electrode layer" comprises the steps:

printing an alignment liquid on the pixel electrode layer and covering the pixel electrode layer, and flowing the alignment liquid into the groove along the sub-drainage groove and attaching to the inner wall of the groove and the sub-drainage groove;

pre-baking the alignment liquid of the inner wall on the pixel electrode layer, the groove and the sub-drainage groove to acquire the alignment layer covering the pixel electrode layer, the inner wall of the groove and the sub-drainage groove.

* * * * *